Figure 3:
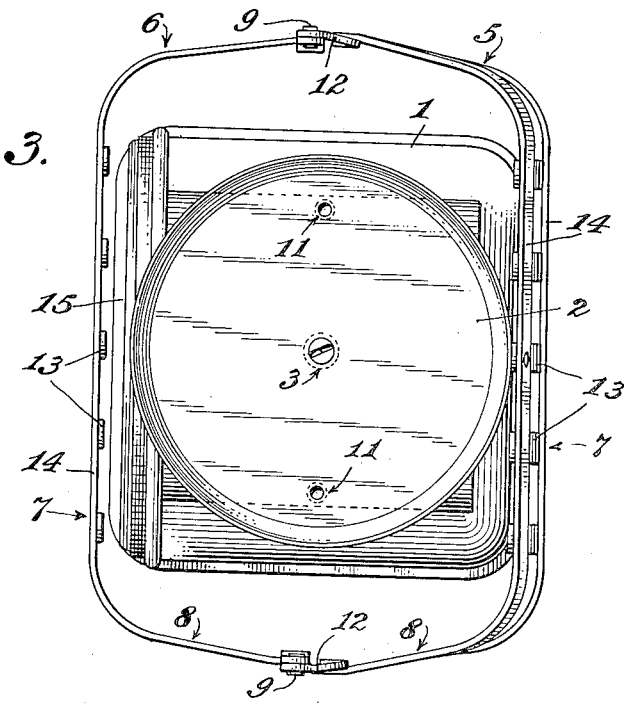

Aug. 6, 1940.  O. ERICKSEN  2,210,399
SCALE
Filed May 26, 1938  2 Sheets-Sheet 1
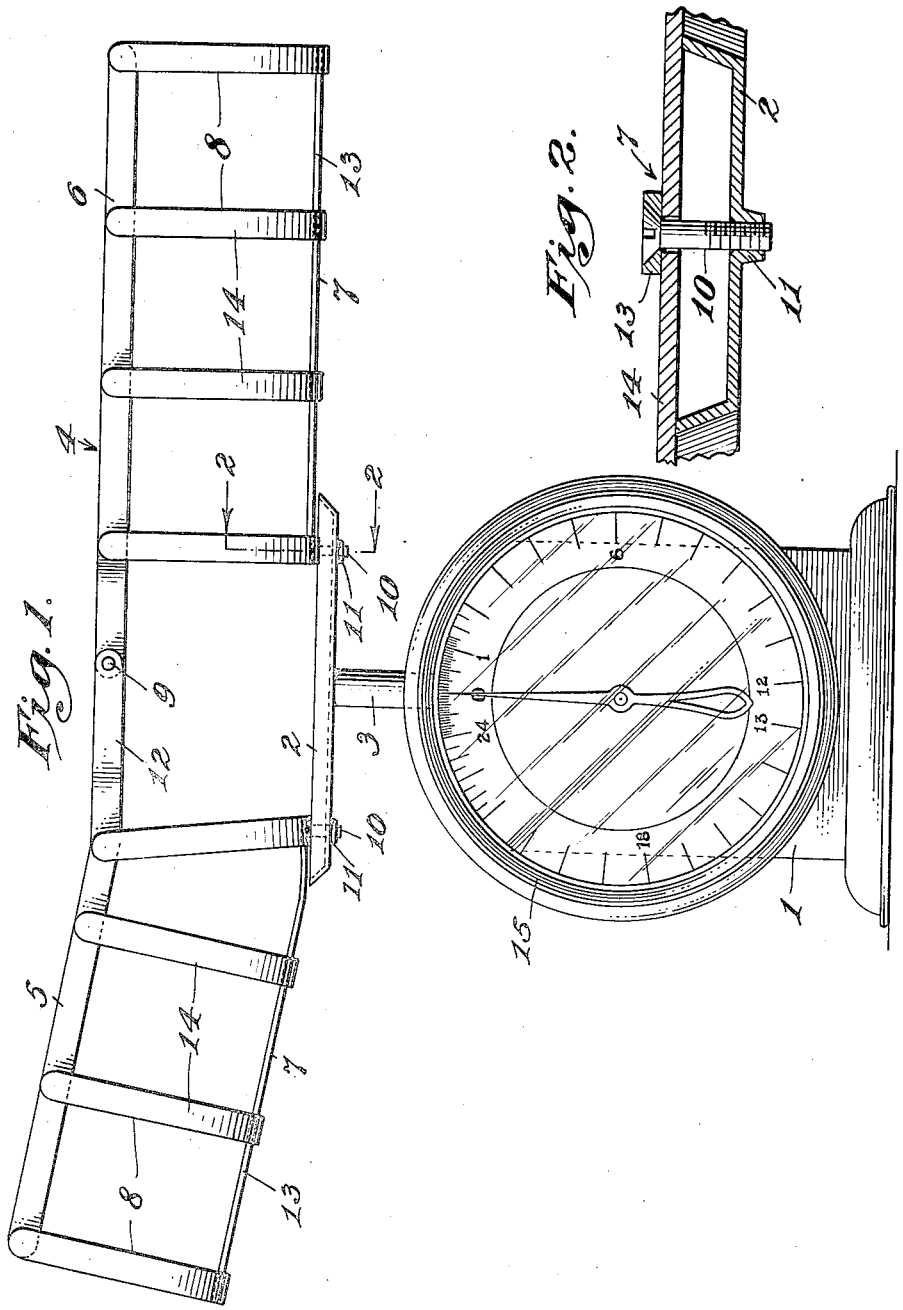
Inventor:
Olaf Ericksen
By his Attorney
Donald W. Robertson Aug. 6, 1940.	O. ERICKSEN	2,210,399
SCALE
Filed May 26, 1938	2 Sheets-Sheet 2

Inventor:
Olaf Ericksen
By his Attorney
Donald W. Robertson

Patented Aug. 6, 1940

2,210,399

UNITED STATES PATENT OFFICE 2,210,399

SCALE

Olaf Ericksen, Brooklyn, N. Y., assignor to John Chatillon & Sons, New York, N. Y., a corporation of New York Application May 26, 1938, Serial No. 210,100

6 Claims. (Cl. 265—27)

The invention relates to weighing scales and baskets therefor. It has particular reference to scales for weighing babies.

Weighing scales which have large load-receiving baskets are quite cumbersome to pack for shipment or storage. Frequently the basket is of such a size relative to the scale as to require the use of a much larger carton than is necessary for the scale. Therefore, when the basket and scale are packed in a single rectangular carton, there is considerable waste space in the carton. This is a disadvantage not only because of the increase in the cubic contents of the package, but also because additional packing material or spacers must be provided to fill up the waste space. In order to reduce packing and shipping costs, it has been proposed to make the load basket of canvas, or other fabric, supported on a metal frame which can be packed in a flat carton separate from the scale. Such an expedient presents the disadvantage of requiring the handling of two packages which may become separated from each other. Moreover, it is not applicable to scales having baskets with rigid bottoms and sides, and which do not pack flat.

It is an object of my invention to provide a scale having a rigid basket which can be packed in a carton that is very little larger than would be required for the scale alone.

A further object is to provide a scale having a basket which can be attached to the scale in a position to provide an inclined head portion, and which can be removed for packing with the scale in a carton with minimum waste space.

Another object of the invention is to provide a scale having a folding basket which can be removed and placed around the body of the scale to protect it during shipment.

Other objects and advantages will appear as the description proceeds.

In the drawings, Fig. 1 is a front elevational view of a weighing scale constructed in accordance with a preferred embodiment of the invention. Fig. 2 is an enlarged detail sectional view on the line 2—2 of Fig. 1.

Figure 4:
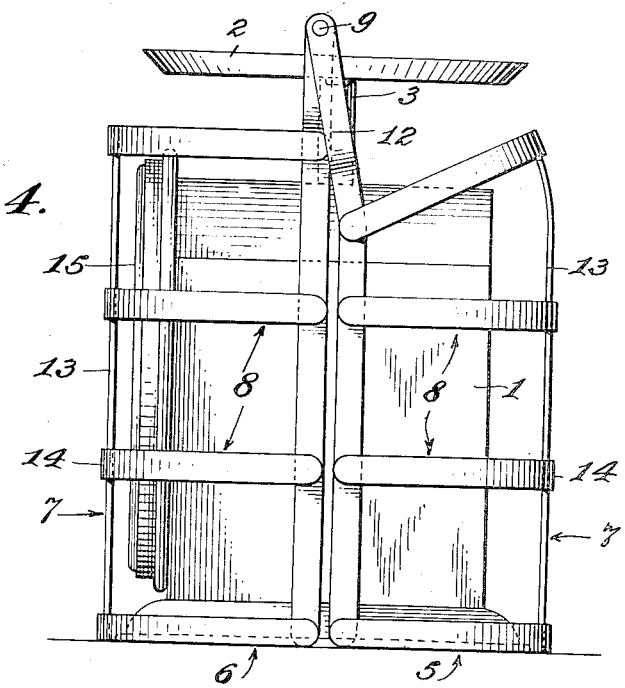

Figs. 3 and 4 show the scale of Fig. 1 with the basket removed and folded around the body portion of the scale for shipment or storage; Fig. 3 being a plan view of the nested scale and basket, and Fig. 4 being a side elevational view thereof.

The scale comprises a body portion 1, platform 2, load-transmitting member 3, and a load-receiving member or basket 4. The weighing mechanism, comprising the members 1, 2, and 3, may be of any convenient construction and ordinarily will be provided with a dial, pointer, and associated spring or balance mechanism contained within the body 1 of the scale. The mechanism of the scale itself forms no part of the present invention. The load-receiving member or basket 4 is constructed and arranged to be removable from the platform 2 and to be folded around the body member 1. For this purpose it is constructed of two rigid sections, a head section 5 and a foot section 6. Each of these sections is formed with a rigid bottom portion 7 and side portions 8. As shown, the load-receiving member is constructed in the form of a basket made of spaced metal strips welded or otherwise secured together. It will be understood, however, that it may be made of solid sheet metal or of sheet metal which has been perforated.

The sections 5 and 6 are hingedly joined together at or near their top edges, as by means of rivets 9. The bottoms 7 of the two sections preferably do not meet at the center of the basket, the bottom being completed by the platform 2 of the scale. If desired, however, the bottoms may be extended into closer proximity so as to overlie the platform 2. The opposing edges of the bottoms of the two sections are secured to the platform 2, as by means of screws 10. The bottom of the platform 2 may be punched in a manner to form downwardly extending flanges 11 (Fig. 2) which are tapped to provide a substantial threaded engagement with the screws.

Figs. 3 and 4 show the nesting of the body portion of the scale within the basket after the screws 10 have been removed and the basket folded to bring its two sections face to face in a position surrounding the body with their sides extending toward each other. In this position the two sections are arranged substantially parallel with their top edges close together (Fig. 4).

It will be observed that the section 5 of the basket is constructed to provide an inclined head portion. The angle between the inclined section and the foot section 6 is maintained by the hinged connection at 9 and the spaced position of the two screws 10. The securing means thus provided therefore serves not only to position the basket on the platform of the scale, but also to maintain the proper angle between the two sections. I prefer that the inside ends 12 of the top edges of the head section 5 be bent so as to occupy a horizontal position when assembled on the scale, as shown in Fig. 1. This permits the two sections of the basket to be of the same width so that they can be brought together as shown in Fig. 4, while remaining hinged together as at 9. These end portions 12, when twisted in the manner shown in Fig. 3, overlap the upper edges of the sides 8 of the section 6 for a short distance so that no interference will be encountered in folding the sections into the position shown.

It will be understood that the construction which I have described makes it possible to pack the scale and basket in a carton that is very little larger than would be required for the scale alone; also that the basket or other load-receiving member can be readily attached to the scale in a position to provide an inclined head portion. Moreover, the rigid bottom and sides of the two sections of the basket, when folded around the scale, serve to protect it against damage during shipment, as might otherwise occur as a result of crushing of the carton in which the mechanism is packed. As will be seen in Figs. 3 and 4, the parallel strips 13 and 14 of the bottom 7 provide an effective protector for the glass face of the dial housing 15. This makes it possible to use a lighter carton, or less packing, with a resultant saving in packing and shipping costs.

If desired, the hinged connection between the two sections may be made otherwise than as specifically illustrated. For example, the two sections can be hooked together in such a way as to permit complete separation of one from the other when they are removed and placed around the body of the scale. The arrangement which I have described, however, is preferred because of its simplicity and the ease with which the parts can be assembled and disassembled.

The terms and expressions which I have employed are used as terms of description and not of limitation, and I have no intention of excluding such equivalents of the invention set forth, or of portions thereof, as fall within the purview of the claims.

I claim:

1. A weighing scale comprising a body portion and a removable load-receiving member, said member consisting of at least two rigid sections of general U-shape in cross section, means pivotally interconnecting the sections and means for detachably connecting the sections to said body portion whereby the sections can be folded to surround the body portion to make a compact unit for shipment.

2. A foldable basket for weighing scales, consisting of two hollow sections foldable to form a box-like structure, said sections having rigid bottoms and rigid upstanding sides, the sides being hingedly joined together near their top edges at points located a substantial distance from the inner faces of the said bottoms, and means for removably attaching the sections to the platform of a scale.

3. A weighing scale comprising a body portion and a removable load-receiving member, said member consisting of at least two rigid sections of general U-shape in cross section, means connecting the sections together and means for detachably connecting the sections to said body portion whereby the sections can be removed and placed face to face in a position surrounding the body portion.

4. A weighing scale comprising a body portion, a platform and a removable load-receiving member, said member consisting of at least two sections, each of the sections having rigid bottoms and rigid upstanding sides to form a box-like structure, the sides of the two sections being hingedly joined together at points located a substantial distance above the top faces of the said bottoms, and means for detachably connecting the sections to said body portion.

5. A weighing scale comprising a body portion, a platform and a removable load-receiving member, said member consisting of at least two sections, each of the sections having rigid bottoms and rigid upstanding sides to form a box-like structure, the sides of the two sections being hingedly joined together at points located a substantial distance above the top faces of the said bottoms, and means for detachably connecting the bottom of each section to the platform.

6. A weighing scale comprising a body portion, a platform, and a load-receiving member, the load-receiving member having an inclined head portion and consisting of two sections of general U-shape in cross-section, means pivotally interconnecting the sections to the body portion, and means for removably attaching the bottom of each section to the platform in a position to maintain the inclination of the head portion.

OLAF ERICKSEN.